Nov. 5, 1968

J W. HAMBY ET AL 3,409,328

SELECTIVELY DUMPABLE BINS

Filed July 13, 1966

J W HAMBY
FRANKY D. MILLS
INVENTORS.

BY *Wayland D. Keith*

THEIR AGENT

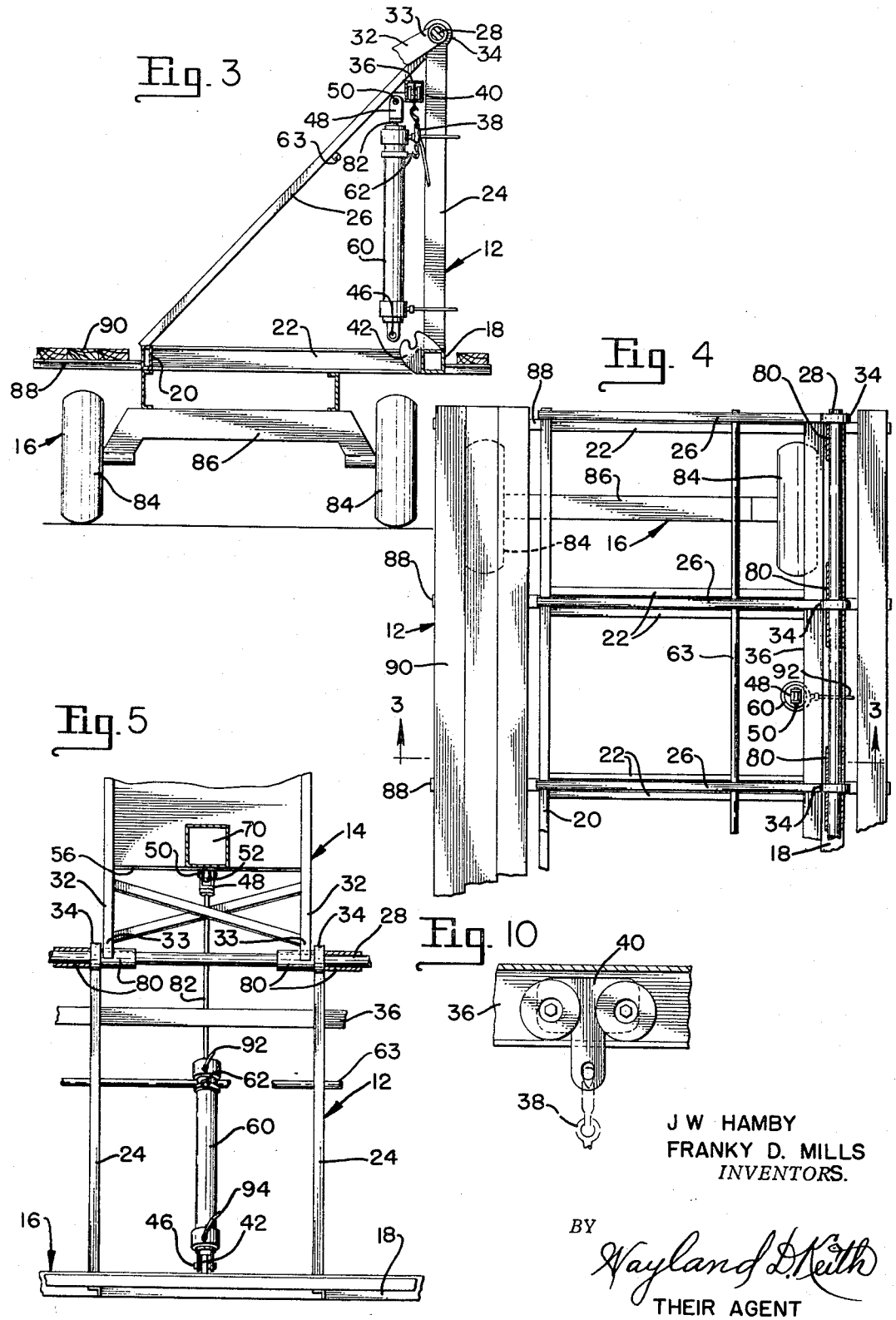

Nov. 5, 1968    J W. HAMBY ET AL    3,409,328
SELECTIVELY DUMPABLE BINS
Filed July 13, 1966    3 Sheets-Sheet 3
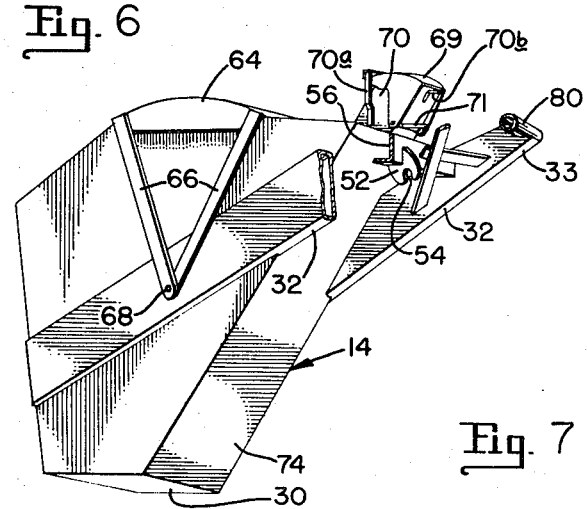
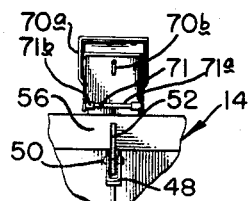
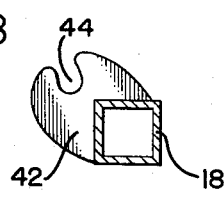
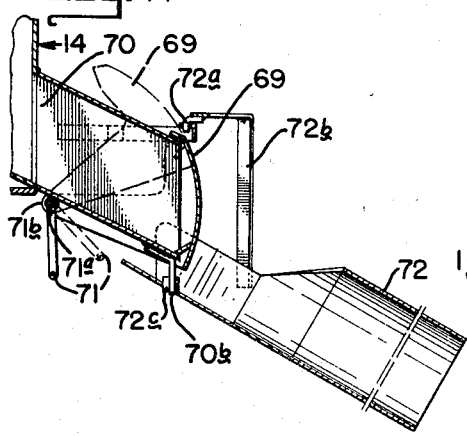
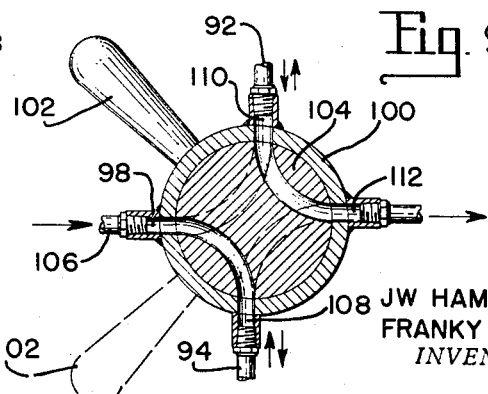
JW HAMBY
FRANKY D. MILLS
INVENTORS.
BY
Wayland D. Keith
THEIR AGENT

United States Patent Office 3,409,328
Patented Nov. 5, 1968

3,409,328
SELECTIVELY DUMPABLE BINS
J W Hamby and Franky D. Mills, Plainview, Tex., assignors to The Hamby Company, Plainview, Tex., a corporation of Texas
Filed July 13, 1966, Ser. No. 569,784
9 Claims. (Cl. 298—8)

ABSTRACT OF THE DISCLOSURE

A device providing a series of bins to be mounted on a movable means, such as a trailer or vehicle, which bins are selectively dumpable by power actuated means. The bins may be all filled with the same material, such as fertilizer, or one or more bins may be filled with a different material, for instance herbicide, insecticide or the like and the trailer moved into a field being prepared for seeding, and the contents of the bins selectively dumped by mechanical means, as required, into a dispensing device. Each bin is provided with a fill opening, having a weather tight cover, and a dispensing chute. The dumping mechanism is a fluid actuated cylinder which may be moved along a trackway and attached to a selected bin to be dumped, and then moved to the next bin, thereby one dumping mechanism may be utilized for a plurality of bins.

This invention relates to a selectively dumpable bin for storing and/or transporting bulk granular material, or the like, wherein a multiplicity of similar bins are placed adjacent to one another in a novel frame arrangement to enable selective dumping of the contents of any single bin.

In the field of bulk granular material transportation, the most efficient operation can be accomplished with a vehicle which carries its own unloading mechanism. More particularly in the agricultural field, it is desirable for a single person to be able to handle bulk material, beginning with loading the material at the distributor, and ending with dumping the material into the agricultural implement which is to be used to distribute or dispense the material. It is necessary for such equipment to not only be simple and efficient in operation, but more importantly, it must be safe in operation to the user thereof, since oftentimes the person operating the farm implement will also be the one who transports the bulk material from the distributor; hence, such a one man operation generally will be out of reach of anyone who can assist with the loading and unloading of the bulk material or to help the person in the case of injury arising from such an operation.

The present invention is directed to an improved construction for mechanically dumping, by power actuated means, the contents of large bins into the hopper of distributing implements or other vehicles.

Another object of this invention is to provide a group of bins for weather tight storage of granular material when in one position and which bins are selectively dumpable when in another position.

It is an object of this invention to provide a bulk hauling vehicle of the described type, having power operated means thereon for selectively lifting bins and dumping the contents thereof into other containers, such as the hopper located on an agricultural implement.

A further object of this invention resides in the novel provision of a single hydraulically operated lifting means which is adapted to cooperate with any selected one of a multiplicity of bins.

A further object of this invention is to provide a novel bin which cooperates with a novel trailer-mounted framework therefor.

Still another object of this invention is to provide a novel frame enclosure which may accommodate a multiplicity of adjacently mounted bins nested therein which bins may be swung about a common mounting means so as to selectively dump the contents of any one of the bins into an awaiting hopper of an agricultural implement, of a vehicle, or of another bin.

A still further object of this invention is to provide a vehicle for transporting bulk material which comprises of a multiplicity of bins along the length of which there is provided a traveling lifting means which is selectively engageable with any one of the bins.

A final object of this invention is to provide an attachable dispensing chute that may be selectively attached to or detached from the dumpable storage bins to enable granular material to be dispensed therefrom in a selected direction.

More specifically, the framework and multiplicity of bins of the present invention contemplate the utilization of a single elongated, load carrying member, mounted longitudinally and to the side of a multiplicity of bins. Each bin is provided with a pair of reinforced cantilever arms by which to pivot the bins about the longitudinal member to a dumping position when the power means selectively engages with a novel structural lifting portion of a bin to move the bin.

Other objects and advantages will appear from the following specification taken in conjunction with the accompanying drawings, wherein:

FIG. 3 is a detail of part of the frame structure taken along line 3—3 of FIG. 4;

FIG. 4 is a fragmentary, top plan view of FIG. 3;

FIG. 5 is a fragmentary, detailed elevational view showing a portion of the structure of the instant novel device with one of the bins being shown in discharging position;

FIG. 6 is a perspective view of one of the bins shown apart from the vehicle and bin lifting means;

FIG. 7 is a partly diagrammatical, partly schematical view showing the hydraulically actuated cylinder and the hydraulic system therefor;

FIG. 8 is a sectional view taken along the line 8—8 of FIG. 7, and shows one of the clevis bearing members;

FIG. 9 shows the control valve structure as shown in FIG. 7;

FIG. 10 is an elevational view of a roller support member within a conveyor track, a portion of the conveyor track being shown in section, and showing in dashed outline, a load binder extending downward from the roller support member; and FIG. 11 is a fragmentary, longitudinal, sectional view through the chute of the discharge opening of the bin, and through the discharge spout, showing the discharge spout supported in pivoted relation on the chute of the discharge opening, with parts broken away and shortened, and shown in dashed outline to bring out the details of construction.

Figure 1:
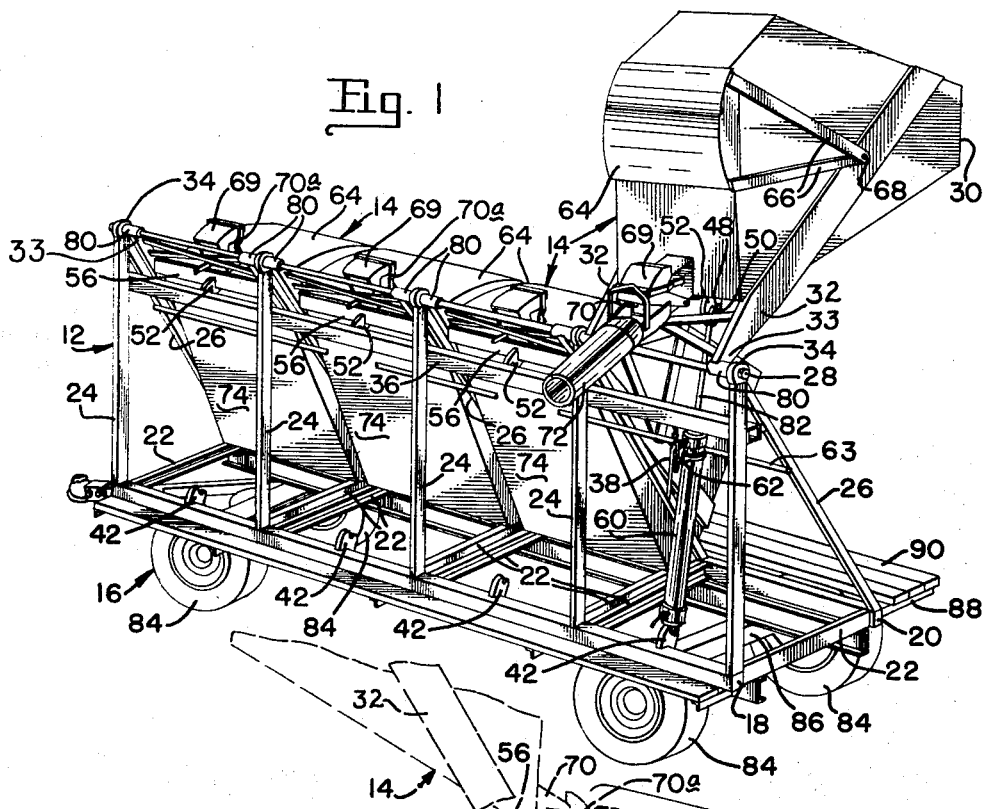
FIG. 1 is a perspective view showing a trailer-mounted version of the novel hauling and dumping mechanism for granular material, with one of the bins being shown in discharge position.
Figure 2:
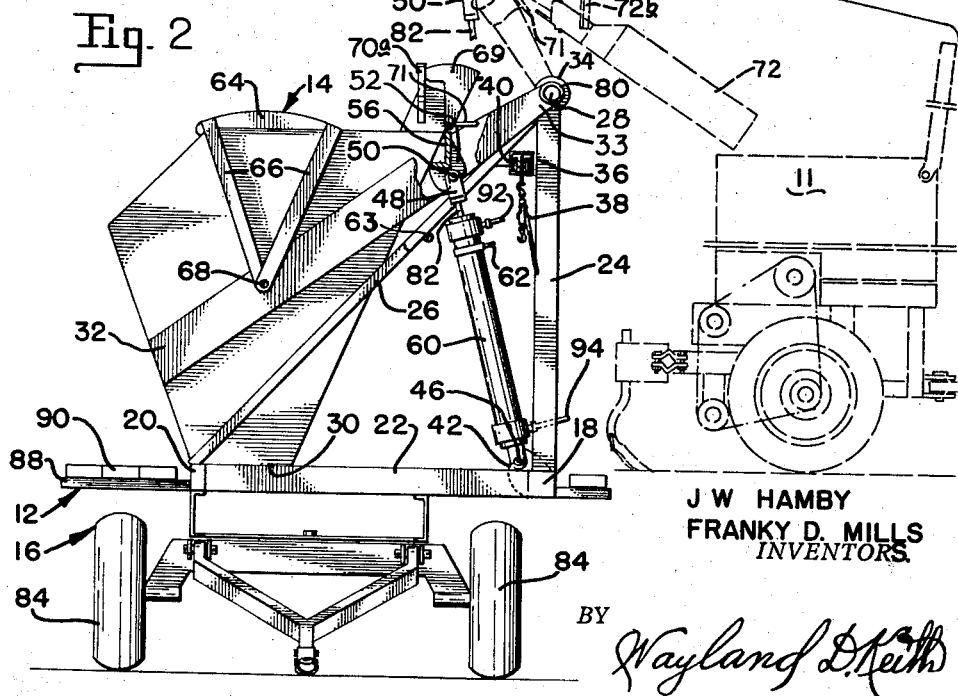
FIG. 2 is an end view of the vehicle for transportation of bulk material or the like, as shown in FIG. 1, with some parts broken away to show certain details therein, and showing, in dashed outline, an agricultural implement having hoppers thereon in position to receive granular material.

Referring more in detail to the drawings, FIG. 2 shows a vehicle 11, for example a tractor drawn fertilizer dispenser, positioned adjacent the novel trailer-mounted bulk unloader 12, with the bins, indicated by the numeral 14, one of the bins 14, FIGS. 1 and 2, being shown in dumping position. The novel selective bulk unloader is indicated generally by the numeral 12, and for purposes of illustration, is shown to be mounted on a trailer 16.

Looking now to the details of the invention, as shown in FIG. 2, in conjunction with the remaining figures, there is seen therein the novel framework which houses a multiplicity of bins 14, with a plurality of the bins 14, three in the present instance, shown nested in the framework or in hauling position, and a fourth bin 14 being shown in the dumping or discharging position. The base of the framework is comprised of two longitudinal side frame members 18 and 20, rigidly connected together by multiple paired floor members 22, vertical upstanding members 24, and diagonal braces or upstanding members 26. The upstanding members 24 are parallel with respect to each other and the diagonal braces or upstanding members 26 are parallel to each other which upstanding members are spaced apart and rigidly secured to the longitudinal side frame members 20 and 18 to form a braced unit, as will best be seen in FIGS. 1 and 3. A longitudinal shaft 28 is positioned on the upper ends of the upstanding members 24 and diagonal braces or upstanding members 26. The members 22, 24, and 26 complete a triangle to brace the longitudinal shaft 28 which is mounted substantially at the apex thereof. The sides of the triangles are spaced apart the minimum distance required to suitably accommodate a bin 14 therebetween, with the base of the triangle, along with longitudinal members 18 and 20, with longitudinal member 20 forming the bottom support for the nested bins.

As shown in FIG. 4, a floor member 22 is positioned at each end of trailer 16 and other floor members 22 are arranged in pairs and bottom support the base 30 of adjacent bins 14 with diagonal braces or upstanding members 26 separating adjacent bins from one another. The longitudinal shaft 28 provides a bearing means about which the individual bins may be selectively pivoted on journaled cantilever arms 32 from the hauling position of bin 14 to the discharge position of bin 14, FIG. 2. Load bearing blocks 34 connect vertical upstanding members 24 while at the same time forming spaced apart limit means which will maintain the bins in aligned condition along the length of shaft 28, as is best illustrated in FIG. 5.

Placed inside the framework and suitably mounted to diagonal braces or upstanding members 26 is a longitudinally disposed conveyor track 36 which accommodates a boomer or load lifting device 38, which boomer is mounted on a roller support member 40, which roller support member 40 is located therein to thereby permit movement of the boomer from one extremity of the conveyor track to the other. The boomer 38 is provided with a handle and hook arrangement, as illustrated, the details of which are well known by those skilled in the art.

A bay is defined by sets of the before mentioned members 22, 24 and 26, and each bay is of a width to suitably accommodate a bin 14. Located midway of each bay and rigidly attached to longitudinal frame member 18, as by welding, are spaced apart lower clevis bearing members 42, as shown in FIGS. 2, 3 and 8. The details of the lower clevis bearing member are illustrated in FIGS. 7 and 8, wherein it is seen that the bearing member 42 is fabricated into a configuration to be saddled onto longitudinal frame member 18. Each clevis bearing member 42 is bifurcated at the upper extremity thereof, as indicated by the numeral 44, so as to enable it to directly receive lower clevis pin 46 therein without removing the pin from the clevis. The upper clevis 48 and pin 50 are similarly received in the upper clevis bearing member 52, which is also provided with a bifurcation 54 and is suitably attached to a transverse beam 56, secured to the lower side of the respective bins 14, as will be more fully brought out hereinafter.

Located longitudinally of the frame and in parallel relationship with the longitudinal side frame members 18 and 20 is a hydraulic cylinder roller support track 36, which is suitably welded to diagonal braces or upstanding members 26, as shown in FIGS. 2, 3 and 4. The longitudinally disposed conveyor track 36 forms a hydraulic cylinder support to provide a support for hydraulic cylinder 60, when the cylinder is not engaged with the upper clevis bearing member 52 and facilitates relocating the hydraulic cylinder 60 into preselected operative position in any selected bay. The hydraulic cylinder 60 is a bin lifting means by which the bins 14 are lifted, which hydraulic cylinder is further provided with a lifting eye 62 which, in turn, can cooperate with the hook of the boomer 38 so as to enable the hydraulic cylinder 60 to be lifted by the boomer and removed from one bay to another. A rod 63 is secured to the lower side of diagonal braces or upstanding members 26 to form a support guard for cylinder 60 to prevent the cylinder from falling against bins 14.

Looking now to the details of one of the bins 14, and with particular reference to FIG. 2, in conjunction with FIGS. 5 and 6, there is seen disclosed therein a bin 14, which is provided with a clam shell type door 64, which door is pivotally suspended by arms 66, which are apertured so as to receive a pivot pin 68 about which the door may swing in order to top load the bin. The bin is further provided with outlet 70, which includes a clam shell type lid 69, the details of which are shown in FIGS. 6 and 11, which clam shell type lid 69 retains any dry granular material within the bin 14 until a spout 72 is suitably attached to release the material or contents therein when the bin is in the inverted or dumping position.

The spout that forms the outlet 70 has a bar 70a secured to the opposite sides thereof and extending outward to form a transverse support bar thereabove, which transverse bar is apertured mediate the ends thereof to receive a down turned pivot pin 72a secured to an inverted U-shaped bracket 72b which bracket is secured to a discharge spout 72 and which bracket 72b will pivotally support the discharge spout 72 in an inclined position, forward and below the outlet opening 70. The chute of the outlet opening 70 has a downwardly extending pivot pin 70b secured thereto which will receive a U-shaped yoke 72c formed in the upper end portion of the lower side of the discharge spout 72 so gravity acting on the weight thereof will hold the U-shaped yoke 72c in pivoted relation with upright pin 70b to pivot the discharge spout 72 about the offset axes of down turned pivot pin 72a and downwardly extending pivot pin 70b.

By having the axes of the pins 72a and 70b offset, the discharge spout will automatically seek, by gravity, a central position, but may be swung from side to side with down-turned pivot pin 72a pivotally supporting the discharge spout 72. A shaft 71a is journaled in bearings 71b to the lower side of the spout of outlet opening 70, to which shaft is secured the arms of clam shell type lid 69, and a lever 71, which enables the moving of clam shell type lid 69 from the position shown in full outline in FIG. 11 to that shown in dashed outline therein, when discharge spout 72 is pivotally supported therebelow, so as to direct granular material from bin 14 into discharge spout 72.

The clam shell type lid 69 may be moved from dashed outline to full outline position, as shown in FIG. 11, to close the outlet 70, wherein discharge spout 72 is readily removed by unhooking down-turned pin 72a from support bar 70a to enable the bin 14 to move from the elevated position, as shown in full outline in FIG. 1 and in dashed outline, FIG. 2, to the seated position shown therein. Both the clam shell type door 64 and the clam shell type lid 69 serve to exclude water from the bin, under normal weather conditions, when in closed position. As seen in FIGS. 2 and 11, each bin is provided with a base 30 and upwardly and outwardly sloping side walls, so as to insure free flow of material therefrom.

Rigidly attached to each side of each bin 14 is cantilever arm 32, which provides or adds to the structural integrity of the bin, while at the same time providing a means by which the bin is rotatably journaled on longitudinal shaft 28 by support rings 80, which support rings are mounted between load bearing blocks 34 to thereby permit the bin to be rotated about shaft 28 from the hauling position shown in full outline to the dumping position shown in dashed outline in FIG. 2. Extending between and rigidly attached to each cantilever arm 32 is a transverse beam 56, which beam has an upper clevis bearing member 52 attached thereto centrally thereof as by welding or the like. The upper clevis bearing member is suitably bifurcated at 54, in the before described manner, so as to be able to receive the upper clevis pin 50 located in the upper clevis or yoke member 48 which, in turn, is attached to plunger of hydraulic cylinder 60. The upper clevis bearing member is vertically aligned with its corresponding lower clevis bearing member 42, with the bifurcations therein facing each other. The lower clevis bearing member 42 is in fixed position with respect to the longitudinal frame member 18 and the upper clevis bearing member 42 is fixed with respect to the rotatable bin 14 and attendant cantilever arms 32. The cantilever arms 32 provide an arcuately movable support means by which a bin 14 may be rotated or pivoted about the upper longitudinal shaft 28 which forms a support for the cantilever lifting arms. The relative movement of the upper clevis bearing member 52 with respect to the lower clevis bearing member 42 is actuated by the hydraulic cylinder 60, as illustrated in FIG. 2.

For purposes of illustration, the framework and the bins nested therein are shown operatively mounted on the trailer 16 having wheels 84 and framework 86 thereon to provide a means of accommodating the framework and bin assembly, as is well known in the art. Suitably mounted to longitudinal floor members 22 by platform support members 88 in a platform 90 located lengthwise of the framework and which is of a dimension to provide a walkway for convenience of the operator.

As seen in FIG. 7, taken in conjunction with FIG. 9, the hydraulic system includes upper and lower fluid lines 92 and 94, which alternately serve as in inlet or an outlet so as to forcibly raise and lower the plunger 82 of the hydraulic cylinder, to provide a hydraulic cylinder-plunger assembly as is well known in the art. A hydraulic pump 96 may be powered by any suitable means, and the pump and reservoir may be located on a tractor, vehicle or on the frame work of the device, so long as the components of the hydraulic system do not interfere with the longitudinal movement of the hydraulic cylinder 60 along the conveyor track 36, and which do not hinder the movement of any of the nested bins. Hydraulic pump 96 delivers fluid pressure through a conduit to inlet port 98 of valve 100.

The handle 102 of valve 100 may be positioned to align the passageways of the arcuately movable valve member 104, as illustrated in FIG. 9, so as to direct the fluid pressure from discharge conduit 106 of pump 96 to inlet port 98 through the arcuately movable valve member 104, out through port 108 into the lower fluid line 94, at the lower extremity of the hydraulic cylinder 60, to thereby cause the piston inside the hydraulic cylinder, which is connected to plunger 82, to exert tremendous pressure against upper clevis bearing member 52. The fluid in the upper portion of the hydraulic cylinder 60 flows into and through conduit 92 to the port 110 of the valve 100 and on to the port 112 thereof, and thence back to the reservoir, thereby providing a closed hydraulic circuit for raising or lowering plunger 82. When it is desired to lower a bin 14, the handle 102 is turned 90°, in a counter-clockwise direction, to thereby enable the pressure from the hydraulic pump 96 to flow through conduit 106 through inlet port 98 of valve 100 and then through passageway 108 in arcuately movable valve 104 and out through port 110 to the upper fluid line 92 of the hydraulic cylinder 60, thus retracting the plunger 82 of the hydraulic cylinder 60. When the arcuately movable valve 104 is moved to the lowering position, ports 108 and 112 will be interconnected by a passageway in vave 104 to thereby provide an outlet through which the fluid in the lower extremity of cylinder 60 will flow from lower fluid line 94 back into the reservoir of the system, as is evident from the drawing.

In the instant example and in order to illustrate the utility of the novel bin and framework, a fertilizing operation is described in conjunction with the present novel invention. It should be understood that other granular like material including insecticide, seeding operations, and harvesting operations may be carried out with this novel device. Furthermore, this novel device will find utility in fields other than the agricultural implement field, as for example, the hauling of dry cement and the like. Also of importance is the hauling of bulk material wherein several different chemicals are to be blended in a specific ratio at the point of delivery. In the last named operation, each of the individual bulk chemicals may advantageously be placed in separate bins in their predetermined proportions and each dumped together in a common container at the point of delivery to thereby effect the hauling of unmixed bulk material that may be custom mixed upon arrival at the point of delivery.

In the specific above case where fertilizer is being applied to a field, the trailer may be towed to the wholesale distributor who will load each of the bins 14 through the opening covered by the clam shell door 64, after which the trailer 16, on which bins 14 are mounted, is towed back to the field which is to be fertilized. Upon arrival at the fertilizing operation, the fertilizer dispenser may be driven adjacent the unloading side of the trailer 16 and with a bin 14 in alignment with an individual hopper of the vehicle 11 for dispensing fertilizer which fertilizer is to be discharged through outlet 70 and spout 72 into the hopper of vehicle 11, as generally illustrated in FIG. 1. Each individual bin 14 is selectively positioned into a dumping position by placing the hydraulic cylinder 60 into the lower and upper clevis bearing members 42 and 52 as indicated in FIG. 2. The hydraulic cylinder 60 is then actuated by positioning handle 102 of the control valve 100 into position to cause the hydraulic cylinder 60 to lift cantilever arm 32 whereby the terminal or journaled end 33 of the arm will pivot about cantilever lifting arm support shaft 28 to the position as indicated by that of bin 14 in FIG. 2. A clam shell type lid 69 and spout 72 are next attached to the outlet 70 of the bin 14 as best seen in FIG. 11, and a lever 71 is moved to open the clam shell type lid 69 on the chute of outlet opening 70 to thereby release the fertilizer or other granular material, whereupon it flows by gravity directly into the fertilizer dispenser 11 or other receiver. Next, the arcuately movable valve 104 is positioned to direct hydraulic fluid into cylinder 60 to lower the bin 14 into its nested position where the base 30 will then contact the members 22 of the floor of the framework.

When it is again desired to replenish the supply of fertilizer in the dispenser, or the like, the dispenser is again positioned adjacent the loading side of the trailer 16 and the boomer 38 hooked into the lifting eye 62 of the hydraulic cylinder, whereupon the hydraulic cylinder 60 may be lifted upwardly and outwardly of each upper and lower clevis bearing member 52 and 42 and then moved longitudinally of the framework of the trailer 16 and along the track 36 to thereby align the hydraulic cylinder 60 with another and different set of clevis bearing members 42 and 52 which are suitably aligned with the next adjacent bin 14 desired to be dumped.

Since longitudinal track 36 permits the boomer 38 to be moved longitudinally of the frame in the lower friction track means to accordingly enable the hydraulic cylinder 60 to be easily placed adjacent any desired bin nested along the framework and in the clevis bearing member bifurcations aligned with the specific preselected bin to be lifted, one man can therefore selectively dump the contents of any single bin of the apparatus.

While the invention has been described in the preferred embodiment thereof, and so illustrated in the accompanying drawings, certain minor changes or alterations may appear to those skilled in the art to which this invention relates, and, therefore, the right is reserved to make such changes or alterations as shall fairly fall within the scope of the appended claims.

Having thus clearly shown and described the invention, what is claimed as new and desired to be secured by Letters Patent is:

1. A bulk receiving and dumping apparatus for handling flowable material, which apparatus comprises;
    (a) an elongated, generally horizontal frame, adapted to be mounted on a base,
        (1) said horizontal frame comprising spaced apart, longitudinal side frame members,
    (b) a plurality of longitudinally spaced apart, rigid, parallel, upstanding members, each having the lower extremity thereof rigidly secured to one of said longitudinal side frame members along a side thereof,
    (c) a plurality of adjacent bins nested on said horizontal frame, in side by side relation each having a pair of parallel, cantilever arms rigidly attached thereto,
        (1) each pair of parallel arms being spaced apart the width of one of said bins,
        (2) each pair of parallel arms being positioned between a pair of said spaced apart, rigid, parallel, upstanding members,
    (d) each said bin having an inlet opening and an outlet opening formed therein,
    (e) a longitudinal shaft rigidly supported near the upper extremities of said upstanding members,
    (f) each pair of said cantilever arms extending from each said bin and each arm having a pivotal end remote from the bin, which pivotal end is journaled on said longitudinal shaft,
    (g) an elongated, horizontally positioned conveyor track rigidly secured to a side of said spaced apart, rigid, parallel, upstanding members, near the upper ends thereof,
        (1) a roller support member associated with said elongated track for movement therealong,
        (2) a load lifting device mounted on said roller support member, and
    (h) bin lifting means secured to said load lifting device for longitudinal movement along said conveyor track, which bin lifting means is adapted to selectively engage one of said bins to rotate said bin about said longitudinal shaft so said bins may be selectively moved about the axis of said longitudinal shaft.

2. A bulk receiving, hauling and dumping apparatus for flowable material, which apparatus comprises;
    (a) an elongated, generally horizontal frame forming a base,
        (1) said horizontal frame including spaced apart, longitudinal side frame members,
        (2) wheels associated with said longitudinal side frame members for movement of said frame over the terrain,
    (b) a plurality of longitudinally spaced apart, substantially parallel, upstanding members, each having the lower extremity thereof rigidly secured to one of said longitudinal side frame members of said horizontal frame,
    (c) a plurality of adjacent bins mounted in side by side relation on said horizontal frame and each having a pair of arms attached thereto, one on each side thereof, which arms extend therefrom,
    (d) each of said bins having an inlet opening and an outlet opening formed therein,
    (e) a longitudinal shaft rigidly supported near the upper extremities of said upstanding members,
    (f) the outwardly extending portion of each said arm having a pivotal end, each which pivotal end is journaled on said longitudinal shaft,
    (g) a compositely movable fluid cylinder-plunger assembly positioned on said horizontal frame for selective engagement with one of said bins and said horizontal frame so said bin may be selectively rotated about the axis of said horizontal shaft by relative longitudinal movement of said fluid cylinder-plunger assembly to enable said bin to be moved to a selected position for dumping and for loading said bin,
    (h) a horizontal conveyor track secured to said parallel, upstanding members near the upper ends thereof,
        (1) a roller support member associated with said conveyor track for movement therealong,
        (2) a load lifting boomer member supported on said roller support member,
        (3) a lifting eye on said fluid cylinder-plunger assembly near the upper end thereof,
        (4) a hook near the lower end of said boomer member to selectively engage the lifting eye on said cylinder-plunger assembly thereon, when in one position, for movement of said fluid cylinder-plunger assembly along said horizontal conveyor track.

3. A bulk receiving and dumping apparatus for handling flowable material, as defined in claim 1; wherein
    (A) said bin lifting means is a hydraulic cylinder-plunger assembly,
        (a) one of said longitudinal side frame members of said horizontal frame is provided with a bearing member to complementally receive an end of said hydraulic cylinder-plunger assembly thereon,
        (b) each said bin having a bearing member thereon to complementally receive the other end of said hydraulic cylinder-plunger assembly,
        (c) one end of said hydraulic cylinder-plunger assembly having a member thereon to selectively and complementally engage said bearing member on said longitudinal side frame member, the other end of said hydraulic cylinder-plunger assembly having a member thereon to selectively and complementally engage said bearing member on one of said bins,
        (d) said hydraulic cylinder-plunger assembly adapted to rotate said bin on the pivotal ends of a pair of said cantilever arms about the axis of said longitudinal shaft, and
        (e) means to selectively direct fluid to said hydraulic cylinder-plunger assembly.

4. A bulk receiving and dumping apparatus for handling flowable material, as defined in claim 1; wherein
    (A) said bin lifting means is a hydraulic cylinder-plunger assembly,
        (a) one of the longitudinal side frame members of said horizontal frame is provided with a plurality of bearing members to selectively and complementally receive an end of said hydraulic cylinder-plunger assembly thereon,
        (b) each said bin having a bearing member thereon to selectively and complementally receive the other end of said hydraulic cylinder-plunger assembly,
        (c) one end of said hydraulic cylinder-plunger assembly having a member thereon to selectively and complementally engage one said bearing member on said longitudinal side frame member, the other end of said hydraulic cylinder-plunger assembly having a member thereon to selectively and complementally engage said bearing member on one of said bins,
        (d) said hydraulic cylinder-plunger assembly adapted to rotate a selected one of said bins on said pivotal ends of a pair of said arms about the axis of said longitudinal shaft, and
        (e) means for selectively directing fluid to said hydraulic cylinder-plunger assembly to actuate said cylinder.

5. A bulk receiving and dumping apparatus for handling flowable material, as defined in claim 3; wherein
   (a) said bearing member on one of said longitudinal side frame members of said horizontal frame is a bifurcated bearing, and
   (b) said member on an end of said hydraulic cylinder-plunger assembly which complementally receives said member on said longitudinal side frame member is a clevis and pin arrangement.

6. A bulk receiving and dumping apparatus for handling flowable material, as defined in claim 5; wherein
   (a) said bearing member on each said bin to selectively receive and engage an end of said hydraulic cylinder-plunger assembly is a bifurcated clevis bearing member, and
   (b) said member on said hydraulic cylinder-plunger assembly to complementally receive said member on a selected bin is a clevis and pin arrangement.

7. A bulk receiving and dumping apparatus for handling flowable material, which apparatus comprises;
   (a) an elongated, generally horizontal frame, adapted to be mounted on a base,
      (1) said horizontal frame comprising spaced apart, longitudinal side frame members,
      (2) a plurality of spaced apart, transverse, diagonal braces, one end of each brace being secured to one of said longitudinal side frame members and extending to a point near the top of a complementary upstanding member mounted on the other said longitudinal side frame member,
      (3) a substantially horizontal track mounted on the lower side of said transverse, diagonal braces and extending substantially parallel with said longitudinal side frame member,
   (b) a plurality of longitudinally spaced apart, aligned, upstanding members, each having the lower extremity thereof rigidly secured to one said longitudinal side frame member along a side thereof,
   (c) a plurality of adjacent bins nested on said horizontal frame, each having a pair of parallel cantilever arms rigidly attached thereto,
      (1) each pair of parallel arms being spaced apart the width of one of said bins,
      (2) each said bin having an inlet opening and an outlet opening formed therein,
   (d) a longitudinal shaft rigidly supported near the upper extremities of said upstanding members,
   (e) each pair of said cantilever arms extending from each said bin and each arm having a pivotal end remote from the bin, which pivotal end is journaled on said longitudinal shaft,
   (f) a cylinder support member movably mounted on said horizontal track,
   (g) a hydraulic cylinder mounted on said movable cylinder support member for movement along said horizontal track, whereby said hydraulic cylinder may be selectively supported thereon, and
      (1) said hydraulic cylinder being adapted to selectively engage one of said bins to rotate said bin about the axis of said longitudinal shaft.

8. A bulk receiving, hauling and dumping apparatus for flowable material as defined in claim 2; wherein
   (a) one of said longitudinal side frame members has longitudinally spaced apart bearings mounted thereon, one intermediate the width of each said bin,
   (b) each said bin having a bearing associated therewith, each which bearing lies substantially in a transverse plane passing through said horizontal frame at the respective points where said respective bearings on said longitudinal side frame member are located,
   (c) said compositely movable fluid cylinder-plunger assembly having means thereto to complementally engage a bearing on a selected one of said longitudinal side frame member, and
      (1) the other end of said fluid cylinder-plunger assembly having means thereto to complementally engage a bearing on a selected one of said bins when said fluid cylinder-plunger assembly is positioned at a selected location intermediate the width of a selected bin.

9. A bulk receiving, hauling and dumping apparatus as defined in claim 8; wherein
   (a) each said bearing and said complementally engageable means for said fluid cylinder-plunger assembly is a bifurcated member and pin.

References Cited

UNITED STATES PATENTS

| 1,160,379 | 11/1915 | Conrad. | |
| 1,554,608 | 9/1925 | Van Ryzin | 298—8 X |
| 2,929,658 | 3/1960 | Killebrew | 298—8 |
| 3,193,150 | 6/1965 | Simas | 222—166 |
| 3,198,495 | 8/1965 | Maxon | 298—7 X |

RICHARD J. JOHNSON, *Primary Examiner.*